3,331,893
PHENOXY PHOSPHORUSIMIDO CHLORIDES AND
PROCESS FOR MAKING SAME
John C. Pernert, Niagara Falls, and Richard B. Tideswell,
Buffalo, N.Y., assignors to Hooker Chemical Corporation, Niagara Falls, N.Y., a corporation of New York
No Drawing. Filed Apr. 9, 1964, Ser. No. 358,635
7 Claims. (Cl. 260—926)

This invention relates to a process for preparing diphenoxyphosphonimidotriphenoxyphosphorane and new phenoxyphosphorusimido halides.

Organo phosphorus compounds which contain the P=N bond possess a number of valuable properties, such as incombustibility and heat resistance. These compounds also have utility for high temperature lubricants and heat transfer agents. Among the organo phosphorus compounds having the above attributes is diphenoxyphosphonimidotriphenoxyphosphorane. A number of methods exist for preparing this compound but none of these is direct and each of them involves a plurality of steps. Each of these methods involve preparing the intermediate compound, dichlorophosphonimidotrichlorophosporane (I)  $Cl_3P=N—POCl_2$ One such method starts with the reaction of phosphorus pentachloride and ammonium chloride in a solvent of high dielectric constant, such as nitrobenzene at or near room temperature to produce the compound having the empirical formula $NP_3Cl_{12}$, for which the structure (II)  $Cl_3P—N=PCl_3^+PCl_6^-$ has been suggested. Reaction of this compound with sulfur dioxide gave (I). Compound I has also been prepared by the reaction of phosphorus pentachloride with amino derivatives of phosphoric acid and by the reaction of phosphorus chlorides with hydroxylamine salts or dinitrogen tetraoxide. In each case (I) is then reacted with sodium phenate to yield diphenoxyphosphonimidotriphenoxyphosphorane.

(III)  $(C_6H_5O)_3P=N—PO(OC_6H_5)_2$

It has now been found that diphenoxyphosphonimidotriphenoxyphosphorane can be more conveniently prepared directly from more readily available starting materials.

In accordance with this invention, there is provided a process for preparing diphenoxyphosphonimidotriphenoxyphosphorane compounds comprising reacting phenoxy phosphorus chloride with a nitrogenous base selected from the group consisting of ammonia and ammonium halide to produce a phenoxy phosphorusimido halide and treating the resulting halide compound with an alkali metal hydroxide to produce diphenoxyphosphonimidotriphenoxyphosphorane. Preferably the ammonium halide is ammonium chloride or ammonium bromide. The phenoxy phosphorus chloride is conveniently prepared in situ by the reaction of triphenyl phosphite and chlorine or phosphorus pentachloride and a phenol under mild conditions. The phenol may be phenol or phenol substituted by lower alkyl of 1 to 6 carbon atoms or halogen, preferably chlorine and bromine. While the phenoxy phosphorus chloride can be prepared at any convenient temperature from zero up to about 95 degrees centigrade, it is preferable that it be prepared in the temperature range from about 20 degrees to about 75 degrees centigrade. The reaction of phenoxy phosphorus chloride and ammonia or ammonium halide is carried out at any convenient temperature above 100 degrees centigrade, although it is preferable that the reaction be carried out between 110 degrees and 200 degrees centigrade. The phenoxy phosphorusimido halide intermediate compound is treated with alkali metal hydroxide at or slightly above room temperature.

The reaction of phenoxyphosphorus chloride and nitrogenous base may be conveniently performed in a suitable solvent such as o-dichlorobenzene, symmetrical tetrachloroethane, monochlorobenzene or trichlorobenzene. Solvents are particularly advantageous when the phenoxy phosphorus chloride is prepared by reaction of chlorine and triphenyl phosphite.

It is desirable, in treating the phenoxy phosphorusimido halide intermediate of this invention with an alkali hydroxide, that the alkali be in a dilute solution preferably about 10 percent, although 4 to 20% is suitable. Suitable alkali hydroxides include sodium hydroxide and potassium hydroxide. The number of phenoxy groups in the phenoxy phosphorus chloride compound may be varied to produce different intermediate phenoxy phosphorusimido chloride compounds. When there are the equivalent of four phenoxy groups in the phenoxy phosphorus chloride the composition having the empirical formula (IV)  $(C_6H_5O)_7P_2NHCl$ is obtained and this compound can be represented by the structure (IVa)  $[(C_6H_5O)_4PNHP^+(OC_6H_5)_3]Cl^-$ or (IVb)  $[(C_6H_5O)_4PNH^+=P(OC_6H_5)_3]Cl^-$ When the phenoxy phosphorus chloride contains three phenoxy groups the resulting phenoxy phosphorusimido chloride compound obtained has the formula (V)  $[(C_6H_5O)_3P=N—P^+(OC_6H_5)_3]Cl^-$ Similar phenoxy phosphorusimido chloride compounds are obtained when other ratios of phenoxy groups are employed. Similar compounds are obtained when the halogen is bromine. The in situ preparation of the phenoxy phosphorus chloride is complete with the cessation of gaseous hydrogen chloride evolution. In a like manner the formation of phenoxy phosphorusimido chloride is considered complete with the cessation of evolution of hydrogen chloride gas.

The invention is illustrated by the following non-limiting examples. Temperatures are expressed in degrees centigrade and parts are by weight unless otherwise indicated.

EXAMPLE 1

Into a reaction vessel equipped with a water condenser and a gas inlet were charged 208.3 parts of phosphorus pentachloride and 376.4 parts of phenol. The reaction mixture was heated at 41 to 70 degrees until the evolution of hydrogen chloride ceased. The reaction mixture was then cooled and ammonia gas was passed into the liquid. A large amount of ammonium chloride was formed. Then the temperature was raised to about 100 degrees centigrade at which the ammonium chloride gradually reacted to evolve hydrogen chloride. Thereafter the temperature was gradually raised to about 200 degrees while additional ammonia was added until no more hydrogen chloride was evolved. The reaction vessel was cooled, and the oily wax produced was washed with water and benzene, by decantation. The waxy solid was twice recrystallized from a chloroform-ether mixture to yield a crystalline off-white solid having melting point of 122 to 123 degrees. This compound had the empirical formula $(C_6H_5O)_7P_2NHCl$ Calculated for $(C_6H_5O)_7P_2NHCl$ it comprises 8.14 percent P, 1.84 percent N, 4.66 percent Cl, 66.04 percent C and 4.59 percent H. Found were 8.13 percent P, 1.78 percent N, 4.75 percent Cl, 65.76 percent C, and 4.48 percent H. The compound $(C_6H_5O)_7P_2NHCl$, in chloroform, was washed with dilute sodium hydroxide. The oil remaining, after removal of chloroform, slowly deposited white needles. Recrystallization from ether yielded $$(C_6H_5O)_3P{=}N{-}PO(OC_6H_5)_2$$

the melting point of which was 74–74.5 degrees. Calculated for $(C_6H_5O)_3P{=}N{-}PO(OC_6H_5)_2$ were a molecular weight 557, 11.1 percent P, 2.51 percent N, 64.6 percent C and 4.5 percent H. Found were 11.1 percent P, 2.67 percent N, 65.2 percent C and 4.6 percent H, with a molecular weight of 550. The infrared spectrum found for the prepared compound was identical to the spectrum reported for $(C_6H_5O)_3P{=}N{-}PO(OC_6H_5)_2$ in the literature.

EXAMPLE 2

To a reaction vessel equipped with a water condenser were charged 141 parts of phenol, 13.4 parts of ammonium chloride and 115 parts of o-dichlorobenzene. To the solution at 25 to 70 degrees were added 104.2 parts of phosphorus pentachloride and hydrogen chloride was evolved. The reactants were then heated under reflux conditions for about seven hours until the reaction was complete, as indicated by cessation of hydrogen chloride evolution. The reaction vessel was cooled to precipitate large rhombic crystals, which were then filtered and dried to yield 79 parts of white powder. The product was recrystallized from anhydrous ethanol and was identified as $[(C_6H_5O)_3P{=}N{-}P^+(OC_6H_5)_3]Cl^-$, having a melting point of 162 to 163 degrees. Calculated analyses for $$[(C_6H_5O)_3P{=}N{-}P^+(OC_6H)_3]Cl^-$$

were 9.26 percent P, 2.09 percent N, and 5.31 percent Cl. Found were 9.08 percent P, 2.18 percent N and 5.6 percent Cl. This compound was dissolved in chloroform and was washed with dilute sodium hydroxide to yield $$(C_6H_5O)_3P{=}N{-}PO(OC_6H_5)_2$$

In a similar manner diphenoxyphosphonimidotriphenoxyphosphorane is prepared when the phenoxy phosphorus chloride is formed in situ by the reaction of triphenyl phosphite and chloride.

Various changes and modifications may be made in the method of this invention and in the composition ratios of this invention, certain preferred forms which have been described. Equivalents may be substituted without departing from the spirit and scope of this invention and these modifications are to be regarded as within the scope thereof.

What is claimed is:

1. A phenoxy phosphorusimido chloride compound selected from the group consisting of $(C_6H_5O)_7P_2NHCl$ and $[(C_6H_5O)_3P{=}N{-}P^+(OC_6H_5)_3]Cl^-$.

2. $(C_6H_5O)_7P_2NHCl$.

3. $[(C_6H_5O)_3P{=}N{-}P^+(OC_6H_5)_3]Cl^-$.

4. A process for preparing diphenoxyphosphonimidotriphenoxyphosphorane compounds comprising reacting phenoxy phosphorus chloride with a nitrogenous base selected from the group consisting of ammonia, ammonium chloride and ammonium bromide to produce a corresponding phenoxy phosphorusimido chloride or bromide and treating the resulting halide compound with an alkali metal hydroxide to produce diphenoxyphosphonimidotriphenoxyphosphorane.

5. The process according to claim 4 wherein the phenoxy phosphorus chloride is prepared in situ by the reaction of phosphorus pentachloride and phenol selected from the group consisting of phenol, lower alkyl substituted phenol and chlorine or bromine substituted phenol.

6. The process according to claim 5 wherein the phenoxy phosphorusimido chloride produced is $$(C_6H_5O)_7P_2NHCl$$

7. The process according to claim 5 wherein the phenoxy phosphorusimido chloride compound is $$[(C_6H_5O)_3P{=}N{-}P^+(OC_6H_5)_3]Cl^-$$

No references cited.

CHARLES B. PARKER, *Primary Examiner.*

ANTON H. SUTTO, *Assistant Examiner.*

UNITED STATES PATENT OFFICE
CERTIFICATE OF CORRECTION

Patent No. 3,331,893                          July 18, 1967

John C. Pernert et al.

It is hereby certified that error appears in the above numbered patent requiring correction and that the said Letters Patent should read as corrected below.

Column 2, line 69, for "comprises" read -- comprised --; column 3, lines 30 and 32, for "$(OC_6H)_3$", each occurrence, read -- $(OC_6H_5)_3$ --; column 4, line 2, for "chloride" read -- chlorine --.

Signed and sealed this 13th day of May 1969.

(SEAL)
Attest:

Edward M. Fletcher, Jr.
Attesting Officer

Commissioner of Patents